US011107007B2

(12) United States Patent
Zheng et al.

(10) Patent No.: US 11,107,007 B2
(45) Date of Patent: Aug. 31, 2021

(54) CLASSIFICATION MODEL GENERATION METHOD AND APPARATUS, AND DATA IDENTIFICATION METHOD AND APPARATUS

(71) Applicant: Advanced New Technologies Co., Ltd., George Town (KY)

(72) Inventors: Yi Zheng, Hangzhou (CN); Peng Zhang, Hangzhou (CN); Jianmin Pan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/085,826

(22) Filed: Oct. 30, 2020

(65) Prior Publication Data

US 2021/0049511 A1     Feb. 18, 2021

Related U.S. Application Data

(63) Continuation of application No. PCT/CN2019/092199, filed on Jun. 21, 2019.

(30) Foreign Application Priority Data

Aug. 14, 2018   (CN) .......................... 201810924268.2

(51) Int. Cl.
  *G06Q 30/00*    (2012.01)
  *G06N 20/00*    (2019.01)
  *G06Q 30/02*    (2012.01)
(52) U.S. Cl.
  CPC ......... *G06N 20/00* (2019.01); *G06Q 30/0185* (2013.01); *G06Q 30/0204* (2013.01)
(58) Field of Classification Search
  None
  See application file for complete search history.

(56) References Cited

U.S. PATENT DOCUMENTS 7,310,626 B2 * 12/2007 Scarborough ........ G06Q 10/063
                                                      706/60
9,594,907 B2 *  3/2017 Duke ................... G06Q 20/308
(Continued)

FOREIGN PATENT DOCUMENTS

CN          106997474         8/2017
CN          107145977         9/2017
(Continued)

OTHER PUBLICATIONS

Srosby et al., "BlockChain Technology: Beyond Bitcoin," Sutardja Center for Entrepreneurship & Technology Technical Report, Oct. 16, 2015, 35 pages (Year: 2015).*

(Continued)

*Primary Examiner* — Joseph M Waesco
*Assistant Examiner* — Jay-Ming Wang
(74) *Attorney, Agent, or Firm* — Fish & Richardson P.C.

(57) ABSTRACT

A computer-implemented method includes obtaining, by one or more processing devices, a training sample dataset, wherein the training sample dataset comprises at least two pieces of sample data and a sample label corresponding to each piece of sample data; constructing, by the one or more processing devices, a first relational network of the at least two pieces of sample data, and representing the at least two pieces of sample data using nodes of the first relational network; obtaining, by the one or more processing devices, a vectorized representation of each node in the first relational network based on a predetermined network embedding learning model; and training, by the one or more processing devices, a classification model based on the training sample dataset, wherein the classification model associates the sample label with the vectorized representation of each node in the first relational network.

18 Claims, 8 Drawing Sheets

(56) References Cited

U.S. PATENT DOCUMENTS

| | | | | |
|---|---|---|---|---|
| 9,892,367 | B2* | 2/2018 | Guo | G06F 16/93 |
| 10,296,832 | B1* | 5/2019 | Segev | G06N 20/00 |
| 10,303,999 | B2* | 5/2019 | Hertz | G06N 5/02 |
| 10,325,224 | B1* | 6/2019 | Erenrich | G06N 20/00 |
| 10,762,563 | B2* | 9/2020 | Belanger | G06N 20/00 |
| 2008/0097940 | A1* | 4/2008 | Ben-Hur | G06K 9/6215 |
| | | | | 706/12 |
| 2010/0205124 | A1* | 8/2010 | Ben-Hur | G06N 20/10 |
| | | | | 706/12 |
| 2018/0082183 | A1* | 3/2018 | Hertz | G06Q 10/10 |
| 2018/0165598 | A1* | 6/2018 | Saxena | G06N 3/006 |
| 2018/0268506 | A1* | 9/2018 | Wodetzki | G06K 9/628 |
| 2018/0365228 | A1* | 12/2018 | Galitsky | G06N 5/003 |
| 2019/0303404 | A1* | 10/2019 | Amer | G06N 3/084 |
| 2019/0304156 | A1* | 10/2019 | Amer | G06N 3/0445 |

FOREIGN PATENT DOCUMENTS

| | | |
|---|---|---|
| CN | 107301246 | 10/2017 |
| CN | 107885999 | 4/2018 |
| CN | 109102023 | 12/2018 |
| TW | I546759 | 8/2016 |

OTHER PUBLICATIONS

Sakamoto, "Bitcoin: A Peer-to-Peer Electronic Cash System," www.bitcoin.org, 2005, 9 pages (Year: 2005).*

DCT International Search Report and Written Opinion in International Application No. PCT/CN2019/092199, dated Sep. 20, 2019, 9 pages (with partial English translation) (Year: 2019).*

Lyu, Tianshu & Zhang, Yuan & Zhang, Yan. (2017). Enhancing the Network Embedding Quality with Structural Similarity. 147-156. 10.1145/3132847.3132900. (Year: 2017).*

Bloemer, Josée & Brijs, Tom & Vanhoof, Koen. (2003). Comparing complete and partial classification for identifying customers at risk. International Journal of Research in Marketing—Int J Res Mark. 20. 10.1016/50167-8116(03)00014-4. (Year: 2003).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/092199, dated Sep. 20, 2019, 9 pages (with partial English translation).

Extended European Search Report on European Application No. 19849872.7 dated May 11, 2021, 10 pages.

Fang et al., "TransPath: Representation Learning for Heterogeneous Information Networks via Translation Mechanism," IEEE Access, Apr. 6, 2018, 6:20712-20721.

PCT International Preliminary Report on Patentability in International Application No. PCT/CN2019/092199, dated Feb. 16, 2021, 10 pages (with English translation).

* cited by examiner

CLASSIFICATION MODEL GENERATION METHOD AND APPARATUS, AND DATA IDENTIFICATION METHOD AND APPARATUS

CROSS-REFERENCE TO RELATED APPLICATIONS

This application is a continuation of PCT Application No. PCT/CN2019/092199, filed on Jun. 21, 2019, which claims priority to Chinese Patent Application No. 201810924268.2, filed on Aug. 14, 2018, and each application is hereby incorporated by reference in its entirety.

TECHNICAL FIELD

The present application relates to the field of computer data security technologies, and in particular, to classification model generation methods and apparatuses, data identification methods and apparatuses, computing devices, and computer storage media.

BACKGROUND

Currently, the anti-money laundering industry identifies suspicious transactions such as crimes by manually designing service features to construct a rule model. A conventional relational network data (for example, a fund network or a same device network) feature is normally obtained through manual construction. For example, statistics on network nodes or edges can be constructed to characterize subgraph patterns of nodes. This type of feature has no good effect on node classification. In addition, this type of statistics-based feature can only describe a pattern of a subgraph in a local (one hop) relationship of a node, and cannot comprehensively represent a subgraph in a multi-hop relationship and valid information may be missing.

SUMMARY

In view of this, embodiments of the present application provide classification model generation methods and apparatuses, data identification methods and apparatuses, computing devices, and computer storage media, so as to alleviate a technical defect in the existing technology.

Some embodiments of the present application disclose a classification model generation method, including: obtaining a training sample dataset, where the training sample dataset includes at least two pieces of sample data and a sample label corresponding to each piece of sample data; constructing a first relational network of the at least two pieces of sample data, and representing the at least two pieces of sample data by using nodes of the first relational network; obtaining a vectorized representation of each node in the first relational network based on a predetermined network embedding learning model; and training a classification model by using the training sample dataset to obtain the classification model, where the classification model associates the sample label with the vectorized representation of each node in the first relational network.

According to another aspect, some embodiments of the present application further provide a data identification method, including: obtaining a to-be-identified dataset, where the to-be-identified dataset includes at least two pieces of to-be-identified data; constructing a second relational network of the at least two pieces of to-be-identified data, and representing the at least two pieces of to-be-identified data by using nodes of the second relational network; obtaining a vectorized representation of each node in the second relational network based on a predetermined network embedding learning model; and determining, based on a pre-trained classification model, a data label corresponding to the vectorized representation of each node in the second relational network.

According to another aspect, some embodiments of the present application further provide a classification model generation apparatus, including: a first acquisition module, configured to obtain a training sample dataset, where the training sample dataset includes at least two pieces of sample data and a sample label corresponding to each piece of sample data; a first construction module, configured to construct a first relational network of the at least two pieces of sample data, and represent the at least two pieces of sample data by using nodes of the first relational network; a first learning module, configured to obtain a vectorized representation of each node in the first relational network based on a predetermined network embedding learning model; and a training module, configured to train a classification model by using the training sample dataset to obtain the classification model, where the classification model associates the sample label with the vectorized representation of each node in the first relational network.

According to another aspect, some embodiments of the present application further provide a data identification apparatus, including: a second acquisition module, configured to obtain a to-be-identified dataset, where the to-be-identified dataset includes at least two pieces of to-be-identified data; a second construction module, configured to construct a second relational network of the at least two pieces of to-be-identified data, and represent the at least two pieces of to-be-identified data by using nodes of the second relational network; a third learning module, configured to obtain a vectorized representation of each node in the second relational network based on a predetermined network embedding learning model; and an identification module, configured to determine, based on a pre-trained classification model, a data label corresponding to the vectorized representation of each node in the second relational network.

According to another aspect, the present application further provides a computing device, including a memory, a processor, and computer instructions that are stored in the memory and that can run on the processor. When executing the computer instructions, the processor implements the steps of the classification model generation method or the data identification method.

According to another aspect, the present application further provides a computer readable storage medium, where the computer readable storage medium stores computer instructions, and the computer instructions are executed by a processor to implement the steps of the classification model generation method or the data identification method.

The present application provides classification model generation methods and apparatuses, and data identification methods and apparatuses, where the data identification method includes: obtaining a to-be-identified dataset; constructing a second relational network of the at least two pieces of to-be-identified data, and representing the at least two pieces of to-be-identified data by using nodes of the second relational network; obtaining a vectorized representation of each node in the second relational network based on a predetermined network embedding learning model; and determining, based on a pre-trained classification model, a data label corresponding to the vectorized representation of each node in the second relational network.

DESCRIPTION OF EMBODIMENTS

Many specific details are described in the following description to facilitate full understanding of the present application. However, the present application can be implemented in many different methods from those described here. A person skilled in the art can perform similar promotion without departing from the intension of the present application. Therefore, the present application is not limited to the specific embodiment disclosed below.

Terms used in some embodiments of the present specification are merely used to describe specific embodiments, and are not intended to limit the some embodiments of the present specification. The terms "a" and "the" of singular forms used in some embodiments of the present specification and the appended claims are also intended to include plural forms, unless otherwise specified in the context clearly. It should also be understood that the term "and/or" used in some embodiments of the present specification refers to including any or all possible combinations of one or more associated listed items.

It should be understood that although terms "first", "second", etc. may be used in some embodiments of the present specification to describe various types of information, the information is not limited to these terms. These terms are only used to differentiate between information of the same type. For example, without departing from the scope of some embodiments of the present specification, first can also be referred to as second, and similarly, the second can be referred to as the first. Depending on the context, for example, the word "if" used here can be explained as "while", "when", or "in response to determining".

First, terms related to some embodiments of the present application are explained.

Anti-money laundering: Financial institutions control money laundering risks in the system through processes, rules or models.

Node2vec: A method for node vectorization in a relational network based on the Word2vec model.

In some embodiments of the present specification, classification model generation methods and apparatuses, data identification methods and apparatuses, computing devices, and computer storage media are provided, and are described in detail in the following embodiments one by one.

Figure 1:
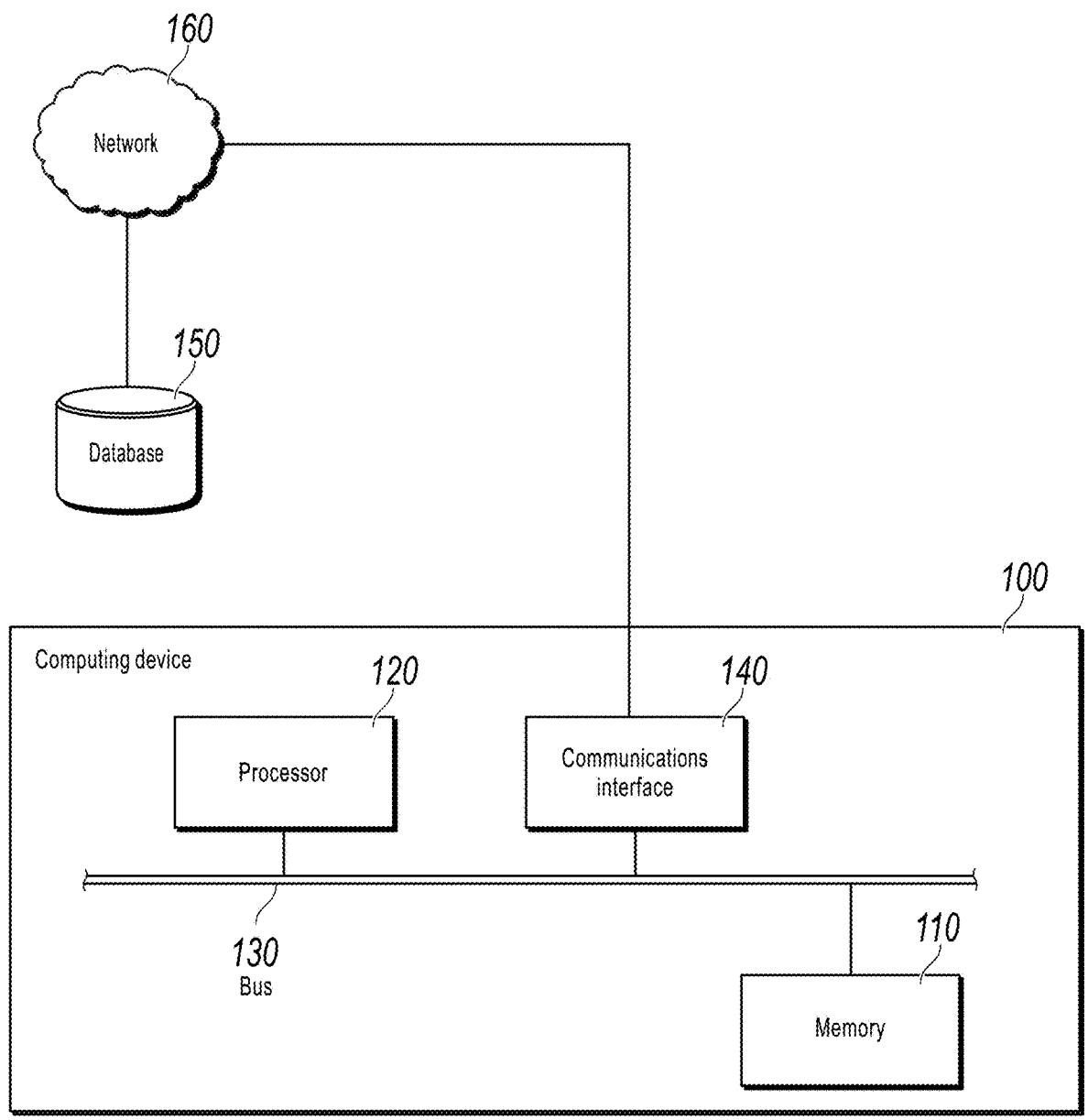
FIG. 1 is a schematic structural diagram illustrating a computing device, according to some embodiments of the present specification.

Referring to FIG. 1, some embodiments of the present specification provide a structural block diagram illustrating a computing device 100. Components of the computing device 100 include but are not limited to a memory 110, a processor 120, and a communications interface 140. The processor 120 is connected to the memory 110 by using a bus 130. A database 150 is configured to store a training sample dataset or a to-be-identified dataset. A network 160 is configured to generate a classification model, and is communicably coupled to the computing device 100 by using the communications interface 140.

The communications interface 140 enables the computing device 100 to communicate through one or more networks. Examples of these networks include a local area network (LAN), a wide area network (WAN), a personal area network (PAN), or a combination of communications networks such as the Internet. The network interface can include one or more of any type of wired or wireless network interface (e.g., a network interface card (NIC)), such as an IEEE 802.11 wireless local area network (WLAN) wireless interface, a global microwave interconnection access (Wi-MAX) interface, an Ethernet interface, a universal serial bus (USB) interface, a cellular network interface, a Bluetooth interface, a near field communication (NFC) interface, etc.

The memory 110 is configured to store a training sample dataset or a to-be-identified dataset that is sent by the communications interface 140 by using the bus 130, and computer instructions that are stored in the memory 110 and can run on the processor 120.

The processor 120 is configured to: after obtaining the training sample dataset or the to-be-identified dataset stored in the memory 110, execute the computer instructions stored in the memory 110, so as to generate the classification model and identify the data.

The computing device 100 can be any type of fixed or mobile computing device, including a mobile computer or mobile computing device (e.g., a tablet computer, a personal digital assistant, a laptop computer, a notebook computer, a netbook, etc.), a mobile phone (e.g., a smartphone), a wearable computing device (e.g., a smartwatch, smart glasses, etc.), or another type of mobile device, or a fixed computing device such as a desktop computer or a PC.

Figure 2:
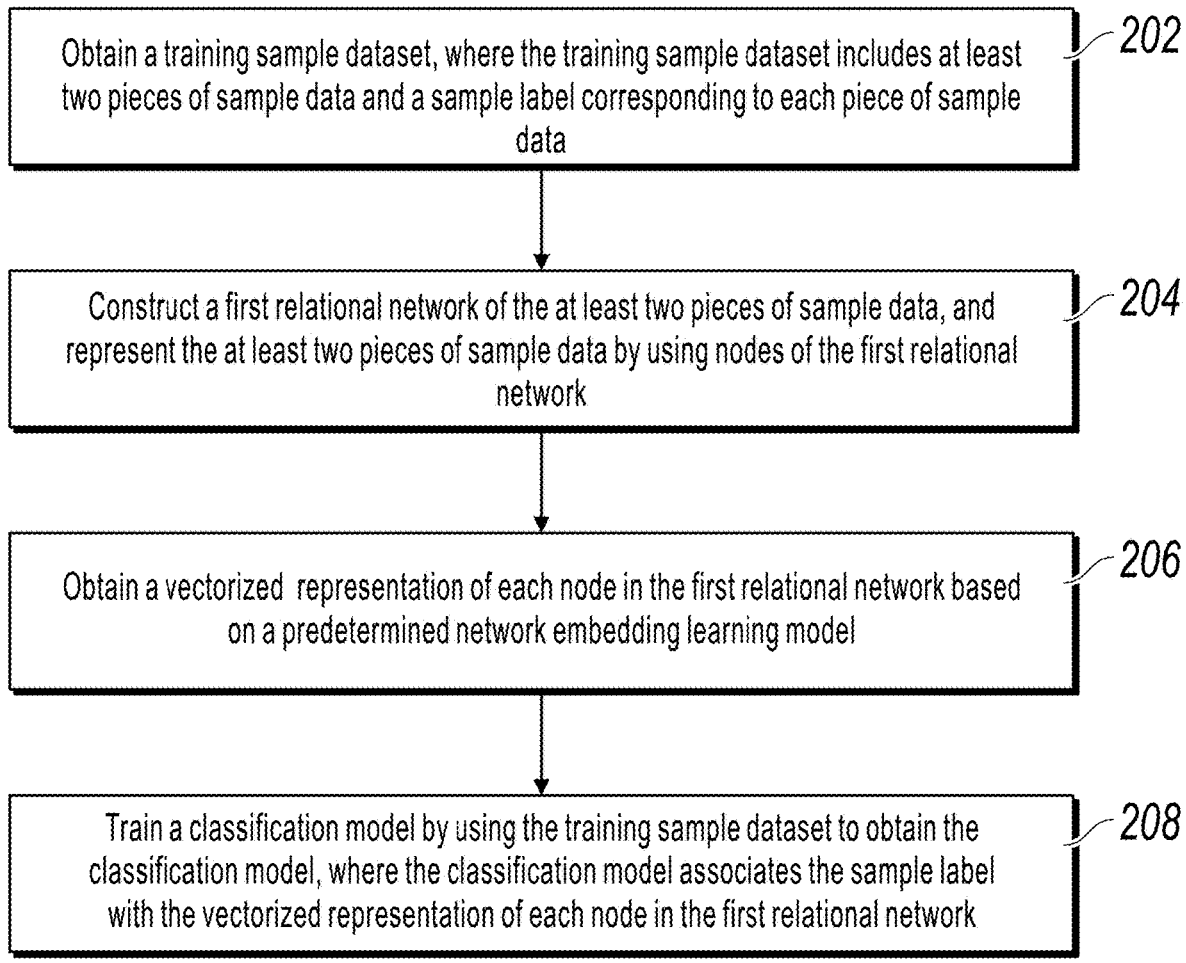
FIG. 2 is a flowchart illustrating a classification model generation method, according to some embodiments of the present specification.

The processor 120 can perform the steps in the method shown in FIG. 2. FIG. 2 is a schematic flowchart illustrating a classification model generation method, according to some embodiments of the present specification, including step 202 to step 208.

Step 202: Obtain a training sample dataset, where the training sample dataset includes at least two pieces of sample data and a sample label corresponding to each piece of sample data.

In some embodiments of the present specification, the sample data includes but is not limited to white sample data and black sample data. The sample label includes but is not limited to a white sample label and a black sample label.

In practice, the training sample dataset is formed by combining the white sample data and a corresponding white sample label with the black sample data and a corresponding black sample label.

When the classification model generation method is applied to an anti-money laundering crime identification field, the black sample data can be an illegal account in which a money laundering behavior exists, and the white sample data can be a legal account in which no money laundering behavior exists; the black sample data can be obtained by using an external public information or by designing a service feature based on expert experience, and the white sample data can be obtained by excluding known black sample data from all samples.

In practice, the quantity of white sample data is far greater than the quantity of black sample data. To avoid an imbalance in sample data in the training sample dataset due to an excessive quantity of white sample data, the ratio of white sample data to black sample data is controlled to be 10:1 to 100:1. Therefore, the white sample data can be obtained by using down-sampling. Using the previous ratio between the white sample data and the black sample data can avoid overfitting of the classification model and negative effects that reduce the learning capability of the classification model.

Step 204: Construct a first relational network of the at least two pieces of sample data, and represent the at least two pieces of sample data by using nodes of the first relational network.

In some embodiments of the present specification, the first relational network includes a series of nodes and relationships, and there can be interaction between nodes, etc. Therefore, a relationship exists between nodes, and relationship construction is derived.

In some embodiments of the present specification, the at least two pieces of sample data represent nodes of the first relational network, and the relationship between the at least two pieces of sample data represent interaction between nodes.

For example, the first relational network is a static fund relational network, and the construction of the first relational network of the at least two pieces of sample data is described in detail.

For example, the at least two samples are obtained accounts that a fund transaction is performed in the last 90 days, and then fund transactions among all accounts are summarized. If the static fund relational network is a directed graph or a weighted graph, a final static fund relational network presents a ternary form, that is, U, V, and W, which indicate that there is a directional edge with a weight W from U to V, which is represented in a service scenario corresponding to the static fund relational network as follows: Account U pays W Yuan to account V. Correspondingly, if the first relational network is a same device relational network of an undirected graph or unweighted graph, in a service scenario corresponding to the same device relational network, it is indicated that both account U and account V use the same device to perform a fund transaction. Therefore, an edge from V to U does not need to be added, and W is set to 1.

Step 206: Obtain a vectorized representation of each node in the first relational network based on a predetermined network embedding learning model.

Figure 3:
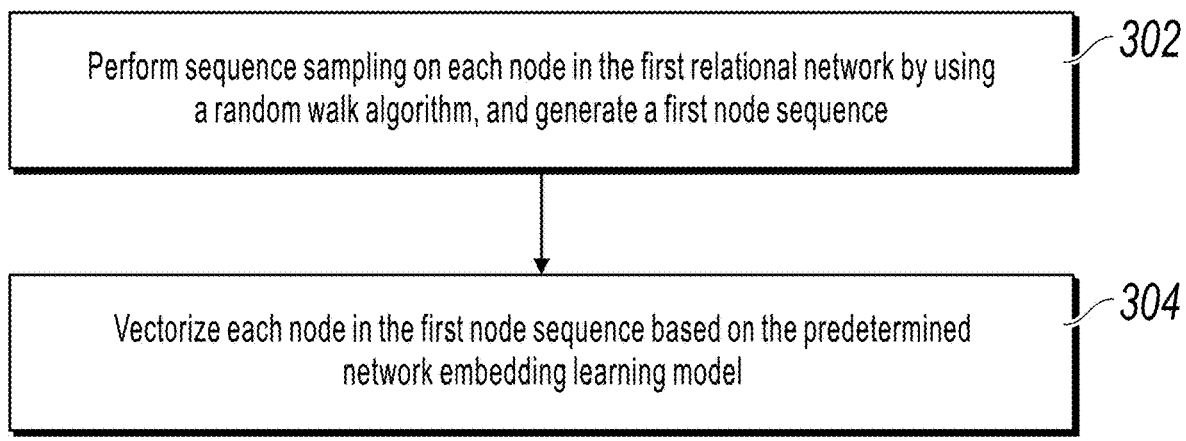
FIG. 3 is a flowchart illustrating a classification model generation method, according to some embodiments of the present specification.

Referring to FIG. 3, in some embodiments of the present specification, obtaining a vectorized representation of each node in the first relational network based on a predetermined network embedding learning model includes step 302 to step 304.

Step 302: Perform sequence sampling on each node in the first relational network by using a random walk algorithm, and generating a first node sequence.

Step 304: Vectorize each node in the first node sequence based on the predetermined network embedding learning model.

In some embodiments of the present specification, vectorizing each node in the first node sequence based on the predetermined network embedding learning model includes: vectorizing each node in the first node sequence based on a Node2vec network embedding learning model; or vectorizing each node in the first node sequence based on a DeepWalk network embedding learning model.

Vectorizing each node in the first node sequence based on a Node2vec network embedding learning model includes: vectorizing, by the Node2vec network embedding learning model, each node in the first node sequence based on the SkipGram framework of Word2vec.

In some embodiments of the present specification, based on the Node2vec network embedding learning model, each node in the constructed first relational network is converted into a node sequence after sampling by using a random walk algorithm, and then, based on a SkipGram framework in the Word2vec model, probability learning and inference are further performed on the node sequence after sampling to finally obtain a vectorized representation of each node in the first relational network. A node vectorized representation obtained by using network embedding learning can enrich a relationship between nodes and improve the processing rate and effect of the classification model.

Figure 4:
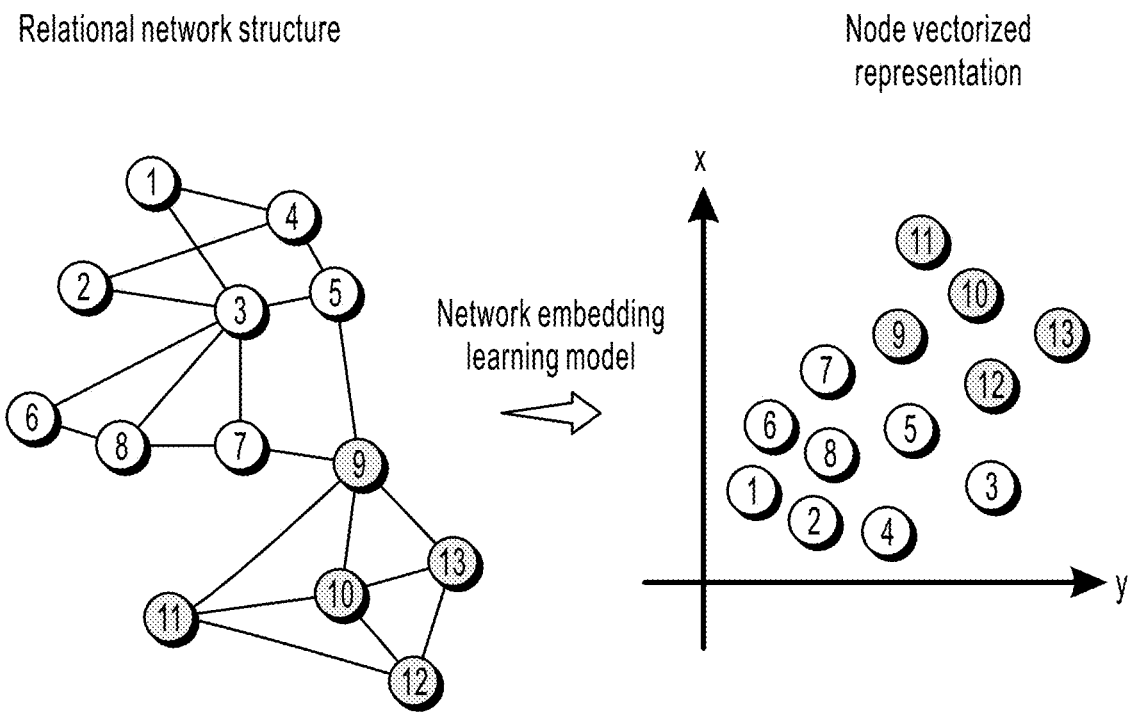
FIG. 4 is a flowchart illustrating a classification model generation method, according to some embodiments of the present specification.

Referring to FIG. 4, the left side is a relational network structural diagram formed by 13 nodes and edges constructed by relationships among the nodes, and the relational network structural diagram is calculated based on the network embedding learning model to obtain a vectorized representation of each of the 13 nodes in the relational network structural diagram on the right side. That is, the relational network structure can be transformed into a multi-dimensional vector through a series of processes. Therefore, complex relational network information can be converted into a structured multi-dimensional feature, and a more convenient algorithm application can be implemented by using a machine learning method.

Step 208: Train a classification model by using the training sample dataset to obtain the classification model, where the classification model associates the sample label with the vectorized representation of each node in the first relational network.

In some embodiments of the present specification, the classification model includes an XGBoost model, a random forest model, a support vector machine (SVM) model, or a logistic regression (LR) model.

In some embodiments of the present specification, the training sample dataset can be further obtained based on a predetermined time interval. In this way of periodically collecting the training sample dataset and training the classification model, a new feature can be adaptively found, and validity of the classification model is continuously ensured.

The predetermined time interval can be set based on actual needs. For example, the predetermined time interval can be set to one week, one month, or three months, which is not limited in the present application.

In some embodiments of the present specification, according to the classification model generation method, the classification model can determine the first relational network feature adaptively by collecting the data sample periodically based on the predetermined time interval, and the classification model can be trained by obtaining the vectorized representation of each node in the first relational network by using the network embedding learning model. As such, working efficiency can be improved, and a network feature pattern of each node in the first relational network can be comprehensively described based on the vectorized representation of each node in the first relational network. In addition, the problem that the training sample dataset becomes invalid can be avoided by collecting data samples periodically.

Figure 5:
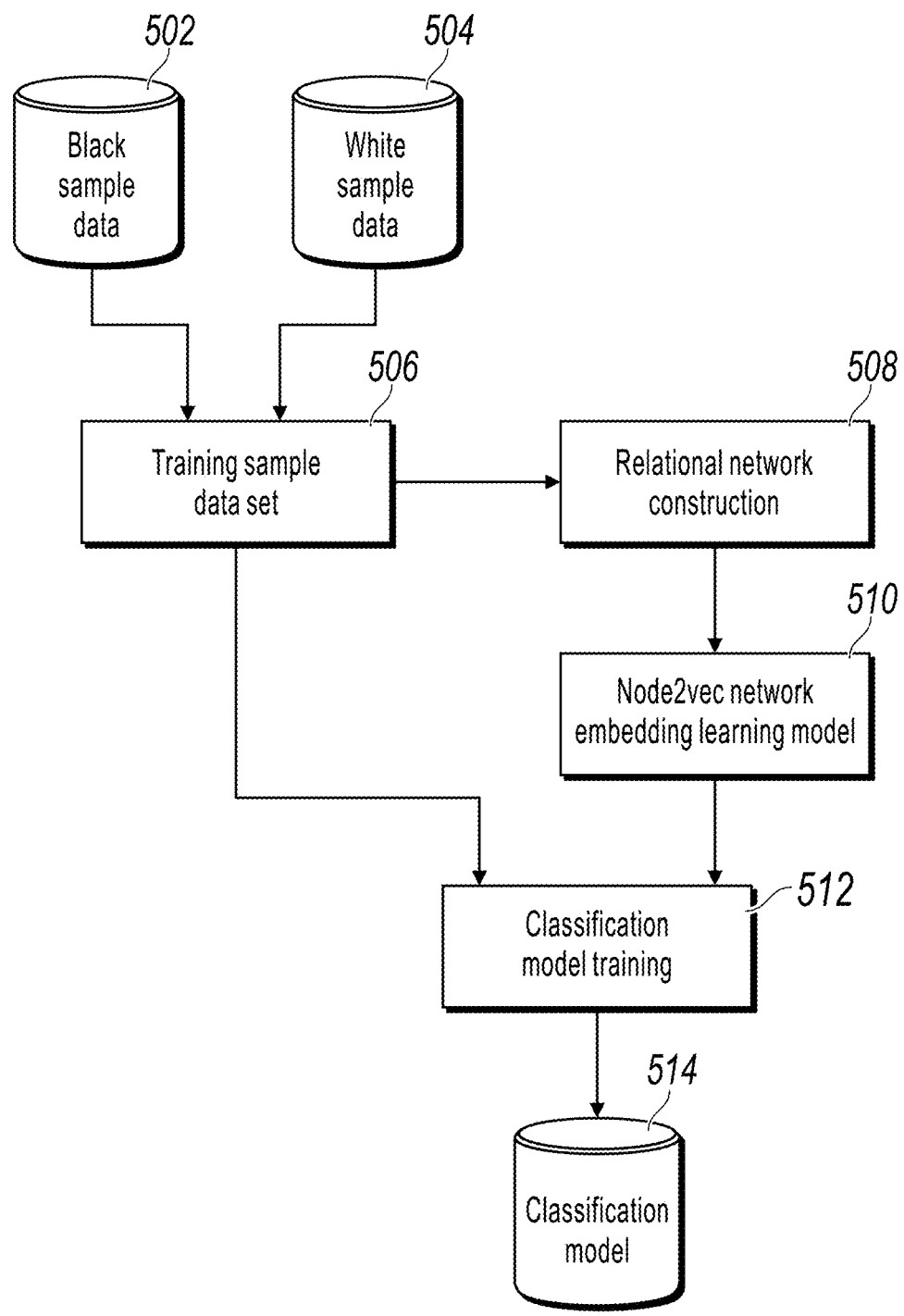
FIG. 5 is a schematic diagram illustrating a relational network structural diagram and a vectorized representation of each node in the relational network structural diagram, according to some embodiments of the present specification.

Referring to FIG. 5, some embodiments of the present specification provide a schematic flowchart illustrating a classification model generation method, including step 502 to step 514.

Step 502: Obtain black sample data and a corresponding black sample label.

Step 504: Obtain white sample data and a corresponding white sample label.

Step 506: Combine the black sample data and the corresponding black sample label with the white sample data and the corresponding white sample label to form a training sample dataset.

Step 508: Construct a relational network of the black sample data and the white sample data, and represent the black sample data and the white sample data by using nodes of the relational network.

Step 510: Obtain a vectorized representation of each node in the relational network based on a Node2vec network embedding learning model.

Step 512: Train a classification model based on the training sample dataset.

Step 514: Obtain the classification model.

In some embodiments of the present specification, according to the classification model generation method, only the black and white data samples need to be collected, then a relational network feature is constructed by using the black and white sample data, and the vectorized representation of each node in the relational network is obtained by using a network embedding learning model, so as to achieve the objective of training the classification model. As such, working efficiency can be improved, and a network feature pattern of each node in the relational network can be comprehensively described based on the vectorized representation of each node in the relational network.

Figure 6:
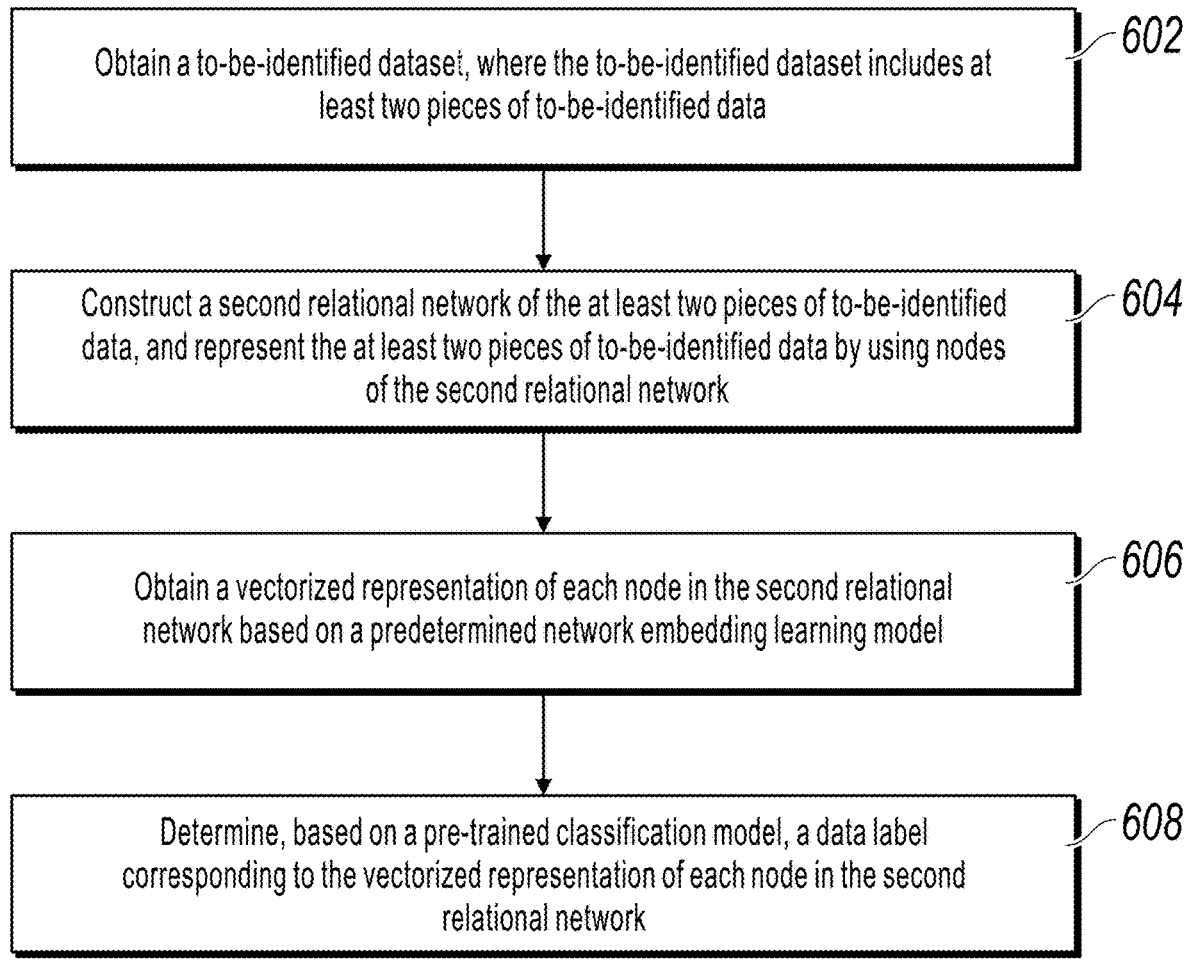
FIG. 6 is a flowchart illustrating a data identification method, according to some embodiments of the present specification.

Referring to FIG. 6, some embodiments of the present specification provide a schematic flowchart illustrating a data identification method, including step 602 to step 608.

Step 602: Obtain a to-be-identified dataset, where the to-be-identified dataset includes at least two pieces of to-be-identified data.

In some embodiments of the present specification, the to-be-identified dataset includes a set of to-be-identified accounts that determines, by using the classification model, whether there is a money laundering behavior.

Step 604: Construct a second relational network of the at least two pieces of to-be-identified data, and represent the at least two pieces of to-be-identified data by using nodes of the second relational network.

In some embodiments of the present specification, step 604 is the same as an operation method of step 204 in the previous embodiment, and details are omitted here for simplicity.

Step 606: Obtain a vectorized representation of each node in the second relational network based on a predetermined network embedding learning model.

In some embodiments of the present specification, obtaining a vectorized representation of each node in the second relational network based on a predetermined network embedding learning model includes: performing sequence sampling on each node in the second relational network by using a random walk algorithm, and generating a second node sequence; and vectorizing each node in the second node sequence based on the predetermined network embedding learning model.

In some embodiments of the present specification, vectorizing each node in the second node sequence based on the predetermined network embedding learning model includes: vectorizing each node in the second node sequence based on a Node2vec network embedding learning model; or vectorizing each node in the second node sequence based on a DeepWalk network embedding learning model.

Vectorizing each node in the second node sequence based on a Node2vec network embedding learning model includes: vectorizing, by the Node2vec network embedding learning model, each node in the second node sequence based on the SkipGram framework of Word2vec.

In some embodiments of the present specification, the second relational network is used as an input, and learning is performed by using the predetermined network embedding learning model, to obtain the vectorized representation of each node in the second relational network.

For example, the predetermined network embedding learning model includes the Node2vec network embedding learning model. Obtaining the vectorized representation of each node in the second relational network by using the network embedding learning model is described in detail.

Step 1: Calculate a transition probability of each edge in the second relational network based on the second relational network structure, to obtain a transition probability graph of the second relational network.

For example, the second relational network has a node U, a node V, and a node K, where the sum of weights of outgoing edges (directed graphs) is Z, a transition probability of each outgoing edge is P(V)=W(U, V)/Z, and W(U, V) represents an edge weight from the node U to the node V. The transition probability graph of the second relational network can be obtained in the previous way.

Step 2: Randomly walk, based on the transition probability graph of the second relational network, to generate a node sequence of each node in the second relational network.

In some embodiments of the present specification, the node sequence of each node in the second relational network constructed by random walk should satisfy the following constraint condition: Assume the current node is V, the last random walk node is U, and an adjacent node of V is K, if the shortest path distance between K and U is 0, a transition probability is W(U, V)/Z/p, where p is a model parameter; if the shortest path distance between K and U is 1, the transition probability is W(U, V)/Z; if the shortest path distance between K and U is 2, the transition probability is W(U, V)/Z/q, where q is a model parameter. The previous random transition process is repeated, and the previous constraint condition is satisfied until a sequence length reaches a specified parameter MAX_LEN, where MAX_LEN is a model parameter.

Step 3: The Node2vec network embedding learning model vectorizes each node in the node sequence based on the SkipGram framework of Word2vec.

In some embodiments of the present specification, the SkipGram framework of Word2vec is used to perform optimization and learning of the model by using stochastic gradient descent, to finally obtain the vectorized representation of each node in the second relational network.

Step 608: Determine, based on a pre-trained classification model, a data label corresponding to the vectorized representation of each node in the second relational network.

In some embodiments of the present specification, the data label includes a white data label and a black data label.

In practice, the white data label is corresponding to a legal account in which no money laundering behavior exists, and the black sample data label is corresponding to an illegal account in which money laundering behavior exists. If the vectorized representation of each node in the second relational network corresponds to a white sample data label, to-be-identified data corresponding to the vectorized representation of the node is a legal account; or if the vectorized representation of each node in the second relational network corresponds to a black sample data label, to-be-identified data corresponding to the vectorized representation of the node is an illegal account.

In some embodiments of the present specification, if the data label is a black data label, subsequent processing is performed on the vectorized representation, corresponding to the data label, of the node in the second relational network.

The subsequent processing includes but is not limited to performing account fund flow tracing or a detailed identity query and login information query of a real user corresponding to an account, which is not limited in the present application.

In some embodiments of the present specification, according to the data identification method, the local subgraph pattern of the second relational network can be comprehensively described by constructing the second relational network by using the to-be-identified dataset, then the vectorized representation of each node in the second relational network is obtained based on the predetermined network embedding learning model, and the data label corresponding to the vectorized representation of each node in the second relational network is quickly determined by using the pre-trained classification model, so as to implement fast identification of the to-be-identified data.

Figure 7:
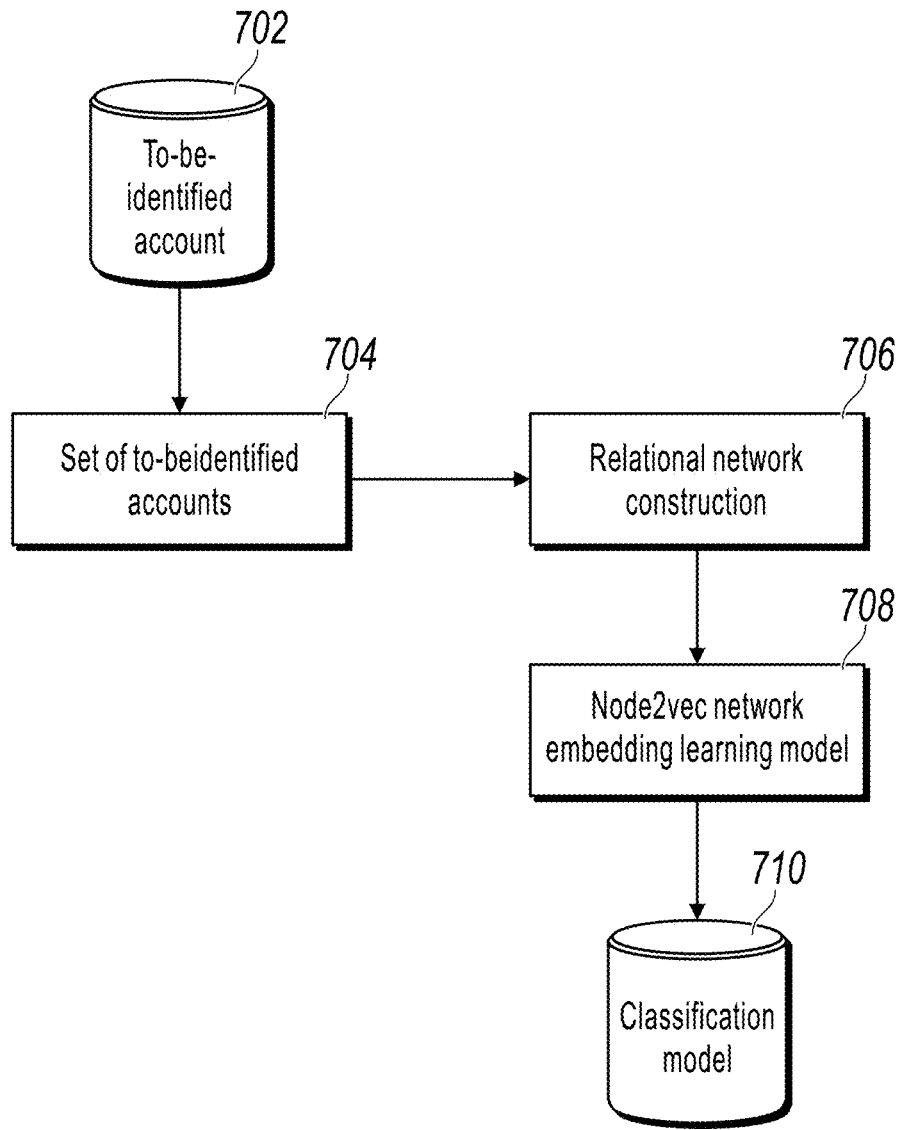
FIG. 7 is a flowchart illustrating a data identification method, according to some embodiments of the present specification.

Referring to FIG. 7, some embodiments of the present specification provide a schematic flowchart illustrating a data identification method, including step 702 to step 710.

Step 702: Obtain at least two to-be-identified accounts.

Step 704: Use the two to-be-identified accounts to form a to-be-identified account set.

Step 706: Construct a relational network of the to-be-identified account set, and represent the to-be-identified account set by using nodes of the relational network.

Step 708: Obtain a vectorized representation of each node in the relational network based on a Node2vec network embedding learning model.

Step 710: Determine, based on a pre-trained classification model, an account label corresponding to the vectorized representation of each node in the relational network.

In some embodiments of the present specification, the method is applied to the anti-money laundering field, original information such as the relational network is used as an input, and a network embedding learning model and a pre-trained classification model are used to implement rapid identification of an account involving a criminal action.

Figure 8:
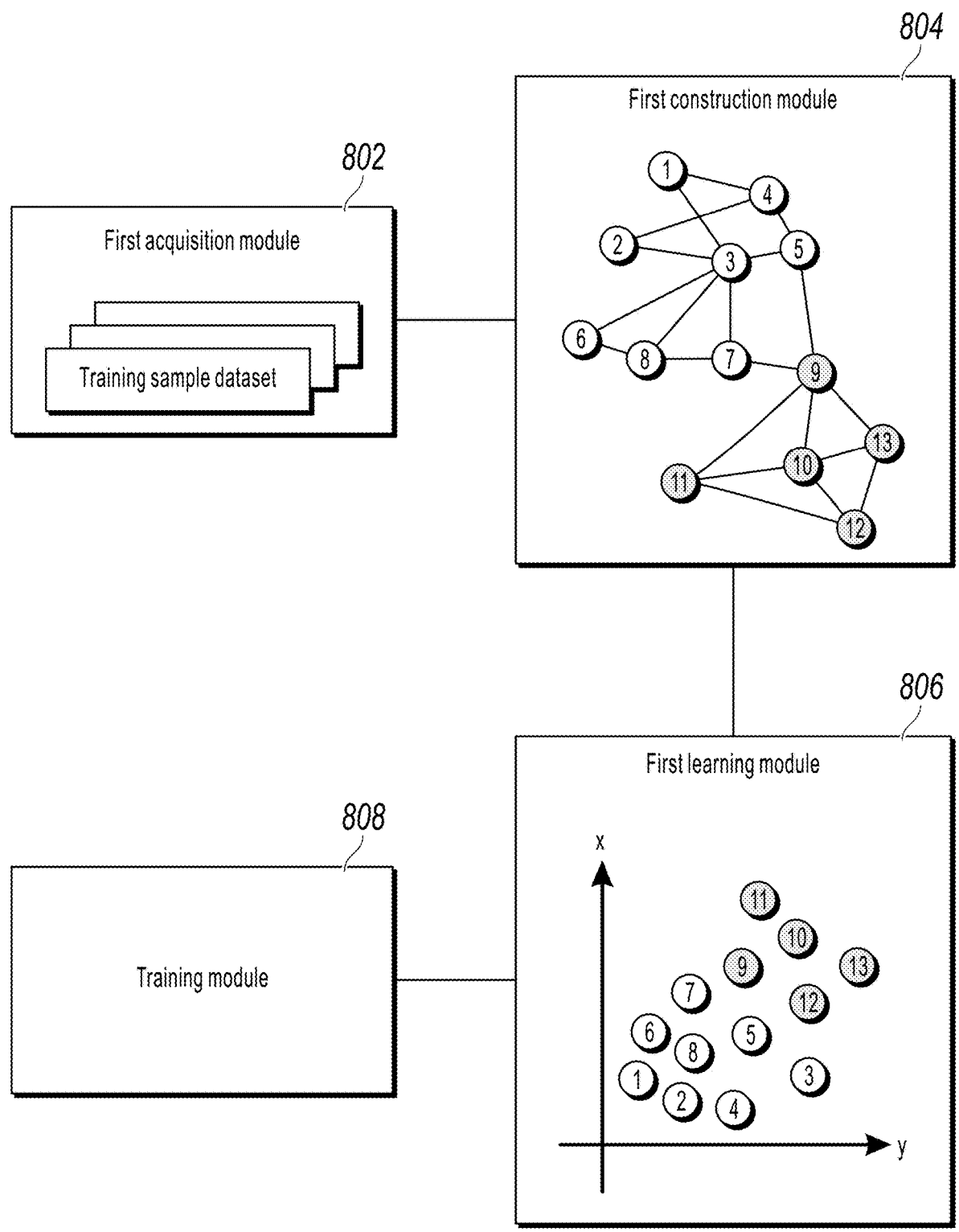
FIG. 8 is a schematic structural diagram illustrating a classification model generation apparatus, according to some embodiments of the present specification.

Referring to FIG. 8, some embodiments of the present specification provide a classification model generation apparatus, including: a first acquisition module 802, configured to obtain a training sample dataset, where the training sample dataset includes at least two pieces of sample data and a sample label corresponding to each piece of sample data; a first construction module 804, configured to construct a first relational network of the at least two pieces of sample data, and represent the at least two pieces of sample data by using nodes of the first relational network; a first learning module 806, configured to obtain a vectorized representation of each node in the first relational network based on a predetermined network embedding learning model; and a training module 808, configured to train a classification model by using the training sample dataset to obtain the classification model, where the classification model associates the sample label with the vectorized representation of each node in the first relational network.

Optionally, the first learning module 806 includes: a first generation submodule, configured to perform sequence sampling on each node in the first relational network by using a random walk algorithm, and generate a first node sequence; and a second learning submodule, configured to vectorize each node in the first node sequence based on the predetermined network embedding learning model.

In some embodiments of the present specification, according to the classification model generation apparatus, the classification model can determine the first relational network feature adaptively by collecting the data sample periodically based on the predetermined time interval, and the classification model can be trained by obtaining the vectorized representation of each node in the first relational network by using the network embedding learning model. As such, working efficiency can be improved, and a network feature pattern of each node in the first relational network can be comprehensively described based on the vectorized representation of each node in the first relational network. In addition, the problem that the training sample dataset becomes invalid can be avoided by collecting data samples periodically.

Figure 9:
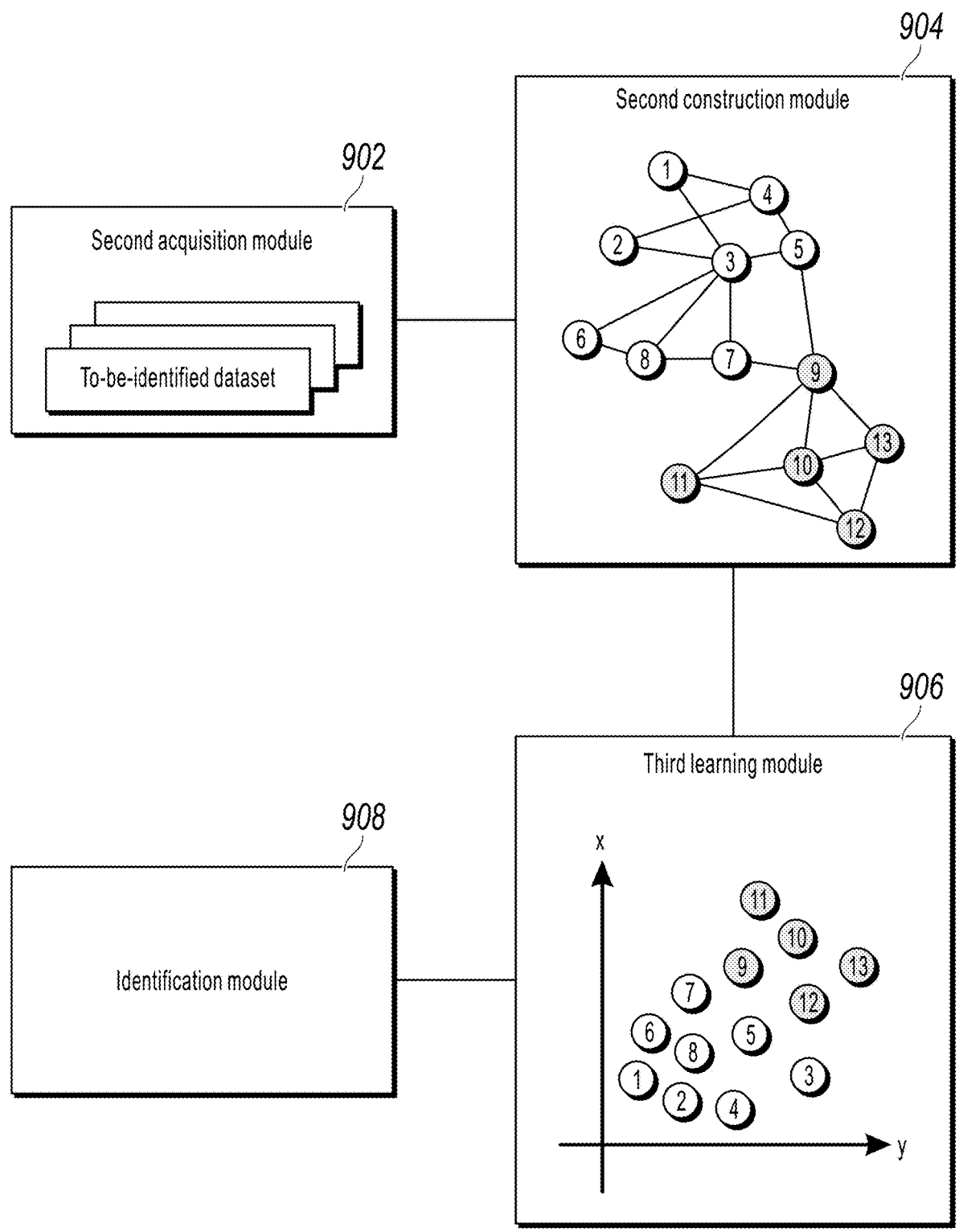
FIG. 9 is a schematic structural diagram illustrating a data identification apparatus, according to some embodiments of the present specification.

Referring to FIG. 9, some embodiments of the present specification provide a data identification apparatus, including: a second acquisition module 902, configured to obtain a to-be-identified dataset, where the to-be-identified dataset includes at least two pieces of to-be-identified data; a second construction module 904, configured to construct a second relational network of the at least two pieces of to-be-identified data, and represent the at least two pieces of to-be-identified data by using nodes of the second relational network; a third learning module 906, configured to obtain a vectorized representation of each node in the second relational network based on a predetermined network embedding learning model; and an identification module 908, configured to determine, based on a pre-trained classification model, a data label corresponding to the vectorized representation of each node in the second relational network.

Optionally, the third learning module 906 includes: a second generation submodule, configured to perform sequence sampling on each node in the second relational network by using a random walk algorithm, and generate a second node sequence; and a fourth learning submodule, configured to vectorize each node in the second node sequence based on the predetermined network embedding learning model.

In some embodiments of the present specification, according to the data identification apparatus, the local subgraph pattern of the second relational network can be comprehensively described by constructing the second relational network by using the to-be-identified dataset, then the vectorized representation of each node in the second relational network is obtained based on the predetermined network embedding learning model, and the data label corresponding to the vectorized representation of each node in the second relational network is quickly determined by using the pre-trained classification model, so as to implement fast identification of the to-be-identified data.

Some embodiments of the present specification are described in a progressive method. The same or similar parts of the embodiments can be referred to each other, and each embodiment focuses on a difference from another embodiment. Particularly, a device embodiment is similar to a method embodiment, and therefore is described briefly. For a related part, references can be made to some descriptions in the method embodiment.

Some embodiments of the present application further provides a computer readable storage medium, where the computer readable storage medium stores computer instructions, and the instructions are executed by a processor to implement the steps of the classification model generation method.

The previous description is a schematic solution of a computer readable storage medium in this embodiment. It is worthwhile to note that the technical solution of the storage medium and the technical solution of the previous classification model generation method belong to the same idea. For details not described in the technical solution of the storage medium, refer to descriptions of the technical solution of the previous classification model generation method.

Some embodiments of the present application further provides a computer readable storage medium, where the computer readable storage medium stores computer instructions, and the instructions are executed by a processor to implement the steps of the data identification method.

The previous is a schematic solution of a computer readable storage medium in this embodiment. It is worthwhile to note that the technical solution of the storage medium and the technical solution of the previous data identification method belong to the same concept. For details not described in the technical solution of the storage medium, refer to descriptions of the technical solution of the previous data identification method.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or may be advantageous.

Technical carriers related to payment in the embodiments of the present application can include, for example, Near Field Communication (NFC), Wireless Fidelity (Wi-Fi), 3G/4G/5G, a technology of swiping card by using a point of sale (POS) machine, a quick response code scanning technology, a bar code scanning technology, Bluetooth, infrared, a short message service (SMS), and a multimedia messaging service (MMS).

The computer instruction includes computer instruction code, and the computer instruction code can be in a source code form, an object code form, an executable file, some intermediate forms, etc. The computer readable medium can include any entity or apparatus that can carry the computer instruction code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, etc. It is worthwhile to note that content included in the computer readable medium can be appropriately increased or decreased according to a need of legislation and patent practice in a jurisdiction, for example, in some jurisdictions, according to legislation and patent practice, the computer readable medium does not include an electrical carrier signal and a telecommunications signal.

It is worthwhile to note that, for ease of description, the previous method embodiments are described as a series of action combinations. However, a person skilled in the art should understand that the present application is not limited to the described action sequence, because according to the present application, some steps can be performed in another order or at the same time. In addition, a person skilled in the art should also understand that the embodiments described in the present specification are all preferred embodiments, and involved actions and modules are not necessarily required by the present application.

In the previous embodiments, the description of each embodiment has respective focuses. For a part not described in detail in some embodiments, references can be made to related descriptions in other embodiments.

The previous disclosed preferred embodiments of the present application are merely intended to help describe the present application. The optional embodiment does not describe all details, and the present application is not merely limited to the specific embodiment method. Clearly, many modifications and changes can be made according to the content of the present specification. The present specification selects and specifically describes these embodiments to better explain principles and practical applications of the present application, so a person skilled in the art can better understand and use the present application. The present application is only limited by the claims and all the scope and equivalents thereof.

What is claimed is:

1. A computer-implemented method, comprising:
    obtaining, by one or more processing devices, a training sample dataset, wherein the training sample dataset comprises at least two pieces of sample data and a sample label corresponding to each piece of sample data;
    constructing, by the one or more processing devices, a first relational network of the at least two pieces of sample data, and representing the at least two pieces of sample data using nodes of the first relational network, wherein each node in the first relational network is connected to a set of adjacent nodes through a set of outgoing edges, each outgoing edge comprising a weight value;
    obtaining, by the one or more processing devices, a vectorized representation of each node in the first relational network based on a predetermined network embedding learning model comprising:
    for each node in the first relational network,
        calculating a transition probability for each outgoing edge of the node based on i) the weight value of the outgoing edge and ii) a sum of weight values of the set of outgoing edges;
        generating a first node sequence using a random walk process based on the transition probability of each outgoing edge, the first node sequence comprising a set of nodes reached during the random walk process; and vectorizing each node in the first node sequence based on the predetermined network embedding learning model; and training, by the one or more processing devices, a classification model based on the training sample dataset, wherein the classification model associates the sample label with the vectorized representation of each node in the first relational network, wherein the classification model is periodically updated based on updated training sample datasets.

2. The computer-implemented method of claim 1, wherein
the updated training sample datasets are based on new training samples periodically collected at predetermined time intervals.

3. The computer-implemented method of claim 1, wherein vectorizing each node in the first node sequence based on the predetermined network embedding learning model comprises:
vectorizing, by the one or more processing devices, each node in the first node sequence based on a Node2vec network embedding learning model.

4. The computer-implemented method of claim 3, wherein vectorizing each node in the first node sequence based on the Node2vec network embedding learning model comprises:
vectorizing, by the one or more processing devices, each node in the first node sequence based on a SkipGram framework of Word2vec.

5. The computer-implemented method of claim 1, wherein vectorizing each node in the first node sequence based on the predetermined network embedding learning model comprises:
vectorizing, by the one or more processing devices, each node in the first node sequence based on a DeepWalk network embedding learning model.

6. The computer-implemented method of claim 1, wherein the classification model comprises an XGBoost model, a random forest model, a support vector machine model, or a logistic regression model.

7. The computer-implemented method of claim 1, further comprising:
obtaining, by the one or more processing devices, a candidate dataset, wherein the candidate dataset comprises at least two pieces of candidate data;
constructing, by the one or more processing devices, a second relational network of the at least two pieces of candidate data, and representing the at least two pieces of candidate data using nodes of the second relational network;
obtaining, by the one or more processing devices, a vectorized representation of each node in the second relational network based on the predetermined network embedding learning model; and
determining, by the one or more processing devices based on the classification model, a data label corresponding to the vectorized representation of each node in the second relational network.

8. The computer-implemented method of claim 7, wherein the data label comprises a white data label and a black data label.

9. The computer-implemented method of claim 8, further comprising:
performing subsequent processing on the vectorized representation, corresponding to the data label, of the node in the second relational network.

10. The computer-implemented method of claim 7, wherein the candidate dataset comprises a set of candidate accounts used to determine, based on the classification model, whether there is a money laundering behavior.

11. A non-transitory, computer-readable medium storing one or more instructions executable by a computer system to perform operations comprising:
obtaining, by one or more processing devices, a training sample dataset, wherein the training sample dataset comprises at least two pieces of sample data and a sample label corresponding to each piece of sample data;
constructing, by the one or more processing devices, a first relational network of the at least two pieces of sample data, and representing the at least two pieces of sample data using nodes of the first relational network, wherein each node in the first relational network is connected to a set of adjacent nodes through a set of outgoing edges, each outgoing edge comprising a weight value;
obtaining, by the one or more processing devices, a vectorized representation of each node in the first relational network based on a predetermined network embedding learning model comprising:
for each node in the first relational network,
calculating a transition probability for each outgoing edge of the node based on i) the weight value of the outgoing edge and ii) a sum of weight values of the set of outgoing edges;
generating a first node sequence using a random walk process based on the transition probability of each outgoing edge, the first node sequence comprising a set of nodes reached during the random walk process; and
vectorizing each node in the first node sequence based on the predetermined network embedding learning model; and
training, by the one or more processing devices, a classification model based on the training sample dataset, wherein the classification model associates the sample label with the vectorized representation of each node in the first relational network, wherein the classification model is periodically updated based on a updated training sample datasets.

12. The non-transitory, computer-readable medium of claim 11, wherein
the updated training sample datasets are based on new training samples periodically collected at predetermined time intervals.

13. The non-transitory, computer-readable medium of claim 11, wherein vectorizing each node in the first node sequence based on the predetermined network embedding learning model comprises:
vectorizing, by the one or more processing devices, each node in the first node sequence based on a Node2vec network embedding learning model.

14. The non-transitory, computer-readable medium of claim 13, wherein vectorizing each node in the first node sequence based on the Node2vec network embedding learning model comprises:
vectorizing, by the one or more processing devices, each node in the first node sequence based on a SkipGram framework of Word2vec.

15. The non-transitory, computer-readable medium of claim 11, wherein vectorizing each node in the first node sequence based on the predetermined network embedding learning model comprises:

vectorizing, by the one or more processing devices, each node in the first node sequence based on a DeepWalk network embedding learning model.

16. The non-transitory, computer-readable medium of claim 11, wherein the classification model comprises an XGBoost model, a random forest model, a support vector machine model, or a logistic regression model.

17. The non-transitory, computer-readable medium of claim 11, wherein the operations further comprise:
   obtaining, by the one or more processing devices, a candidate dataset, wherein the candidate dataset comprises at least two pieces of candidate data;
   constructing, by the one or more processing devices, a second relational network of the at least two pieces of candidate data, and representing the at least two pieces of candidate data using nodes of the second relational network;
   obtaining, by the one or more processing devices, a vectorized representation of each node in the second relational network based on the predetermined network embedding learning model; and
   determining, by the one or more processing devices based on the classification model, a data label corresponding to the vectorized representation of each node in the second relational network.

18. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
   obtaining, by one or more processing devices, a training sample dataset, wherein the training sample dataset comprises at least two pieces of sample data and a sample label corresponding to each piece of sample data;
   constructing, by the one or more processing devices, a first relational network of the at least two pieces of sample data, and representing the at least two pieces of sample data using nodes of the first relational network, wherein each node in the first relational network is connected to a set of adjacent nodes through a set of outgoing edges, each outgoing edge comprising a weight value;
   obtaining, by the one or more processing devices, a vectorized representation of each node in the first relational network based on a predetermined network embedding learning model comprising:
      for each node in the first relational network,
         calculating a transition probability for each outgoing edge of the node based on i) the weight value of the outgoing edge and ii) a sum of weight values of the set of outgoing edges;
         generating a first node sequence using a random walk process based on the transition probability of each outgoing edge, the first node sequence comprising a set of nodes reached during the random walk process; and
         vectorizing each node in the first node sequence based on the predetermined network embedding learning model; and
   training, by the one or more processing devices, a classification model based on the training sample dataset, wherein the classification model associates the sample label with the vectorized representation of each node in the first relational network, wherein the classification model is periodically updated based on updated training sample datasets.

* * * * *